(12) United States Patent
Hosaka et al.

(10) Patent No.: US 6,287,660 B1
(45) Date of Patent: *Sep. 11, 2001

(54) OPTICAL RECORDING MEDIUM AND ITS SUBSTRATE

(75) Inventors: Tomiharu Hosaka, Yawata; Yoshihiro Tosaki, Ibaraki; Toshiaki Kunieda, Minoo; Yukako Doi, Takatsuki; Katsuyuki Takahashi, Yawata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,830

(22) PCT Filed: Apr. 23, 1998

(86) PCT No.: PCT/JP98/01866

§ 371 Date: Dec. 22, 1998

§ 102(e) Date: Dec. 22, 1998

(87) PCT Pub. No.: WO98/48417

PCT Pub. Date: Oct. 29, 1998

(30) Foreign Application Priority Data

Apr. 24, 1997 (JP) .................................................. 9-106994

(51) Int. Cl.⁷ ...................................................... B32B 3/02
(52) U.S. Cl. ...................... 428/64.1; 428/64.4; 428/64.8; 428/457; 428/913; 430/270.14; 430/495.1; 430/945; 369/275.4
(58) Field of Search ................................. 428/64.1, 64.2, 428/64.4, 64.5, 64.8, 457, 913; 430/270.11, 270.12, 270.14, 495.1, 945; 369/275.1, 275.4

(56) References Cited

U.S. PATENT DOCUMENTS 5,075,147 * 12/1991 Usami .................................. 428/64.1

5,448,551 * 9/1995 Miyagawa ............................ 369/271
5,970,027 * 10/1999 Narita ................................... 369/13
5,972,459 * 10/1999 Kawakubo .......................... 428/64.1

FOREIGN PATENT DOCUMENTS 4-358331   12/1992 (JP) .

OTHER PUBLICATIONS

Patent Abstracts of Japan, by Ito Toshiki et al., entitled "Optical Information Recording Medium", dated Nov. 29, 1996, 1 page.
Patent Abstracts of Japan, by Ajiki Seiichi, entitled "Optical Disk and Optical Information Recording and Reproducing Device", dated Oct. 4, 1991, 1 page.
Patent Abstracts of Japan, by Tanaka Toshimitsu, entitled "Master Disk for Manufacturing Optical Disk, its Manufacture and Forming Body for Optical Disk", dated Nov. 9, 1989, 1 page.
Patent Abstracts of Japan, by Yanagisawa Shuichi, entitled "Optical Recording Disk", dated Jul. 20, 1987, 1 page.

* cited by examiner

Primary Examiner—Elizabeth Evans
(74) Attorney, Agent, or Firm—Wenderoth, Lind & Ponack, L.L.P.

(57) ABSTRACT

An optical recording medium having a light absorption layer formed on a substrate having a spiral groove by means of the vacuum deposition and a reflective layer formed on the light absorption layer, wherein:

(1) the groove of the substrate has a groove section of which cross section is a trapezoidal;
(2) a ratio of a groove width (W) to a track pitch (TP) (W/TR) of the substrate falls within a range of 0.25 to 0.45;
(3) a groove depth (D) is 20 to 80% of ($\lambda/4n$) (wherein $\lambda$ is a wavelength of a laser beam, and n is a refractive index of the substrate); and
(4) angles $a_1$ and $a_2$ formed by both side surfaces of the groove section and surfaces vertical to a groove bottom surface on cross lines between the both side surfaces of the groove section and the groove bottom surface are 45 to 80°, and a difference between $a_1$ and $a_2$ ($a_1-a_2$) is not more than ±10°.

22 Claims, 2 Drawing Sheets

OPTICAL RECORDING MEDIUM AND ITS SUBSTRATE

TECHNICAL FIELD

The present invention relates to an optical recording medium, a substrate which is used for the production of the optical recording medium and a metal mold such as a stamper which is used for the production of the substrate.

BACKGROUND OF THE INVENTION

In recent years, a compact disk (hereinafter, referred to as a CD) has been in common use, and accordingly a writing-once type optical disk (hereinafter, referred to as a CD-R) which meets the CD standard has been developed and used. The CD-R uses a disk-shaped transparent resin substrate having a spiral groove transferred by means of a stamper upon the time of forming. After the substrate is coated with an organic dye (or pigment) solution by a spin coater, a light absorption layer (or a recording layer) is formed by drying the solution, a reflective layer is formed on the light absorption layer by for example sputtering gold, and a protective layer is formed by coating the reflection layer with an ultraviolet curable resin by a spin coater or the like followed by curing the resin. The CD-R is composed of the substrate, the light absorption layer, the reflection layer and the protective layer. The optical recording medium, in which the light absorption layer is thus formed by coating the substrate with the organic dye solution is also referred to as a coating type optical recording medium.

Information is recorded on the CD-R in such a manner that pits corresponding to the information is formed in the optical recording medium in accordance with any combination of change in properties of the organic dye caused by irradiation of the light absorption layer with a laser beam having a wavelength of about 780 nm, decomposition and change in optical constants of the organic dye caused by such irradiation and deformation of the substrate due to heat generation at the time of the decomposition or the change in properties. Moreover, the recorded information is reproduced by detecting a change in an amount of a light reflected from the pits. Such manners of recording/reproducing information on/from the optical recording medium is well-known.

In the case where information is recorded on or reproduced from the CD-R by using a CD-R writer for recording/reproducing, or in the case where information is reproduced by using a CD player or a CD-ROM drive, the optical recording medium needs to a stable servo characteristic which allows a pick-up member to move promptly to a predetermined position along a groove of the substrate.

In order to stabilize the servo characteristic, it is important to improve particularly a tracking error (TE) signal and a radial contrast (RC) signal among various characteristics of the CD-R. Moreover, it is necessary to produce a high-quality reproduction signal at the time of the reproduction, and it is particularly important to obtain a stable output with less fluctuation. Factors which greatly influence these characteristics are as follows: as for the tracking error signal, a difference in level between a light absorption layer formed on a groove section formed on the substrate having the groove section and a light absorption layer formed on the inter-groove section (a portion of the substrate between the adjacent groove sections); as for the radial contrast, a width of the groove section on the substrate; and as for the fluctuation of the output signal, fluctuation in a thickness of the light absorption layer (particularly, fluctuation along a radial direction of the substrate).

For the coating type CD-R, in order to ensure these properties, the following is performed. In order to form the light absorption layer on the substrate, a substrate of which groove is comparatively deep is used because when the substrate is coated with the organic dye solution, the solution is likely to preferentially fill the groove of the substrate. Since the groove depth is likely to be shallower along a direction from an inner periphery to an outer periphery of the substrate at the time of the substrate production, such a substrate having the deep groove is produced so as to suppress such inclination (or slope) of the groove depth by adjusting substrate production conditions (for example, a temperature of a melted resin, temperature distribution of a metal mold and the like).

In addition, since a thickness profile of the light absorption layer is inclined along a direction from an inner periphery to an outer periphery of the disk due to evaporation of the organic dye solution at the time of fabrication process of the light absorption layer of the optical recording medium by spin-coater, the light absorption layer is formed so as to suppress the inclination of the thickness profile while precisely adjusting the conditions of the application of the organic dye solution (for example, adjustment of viscosity of the organic dye solution, control of rotation of a spin coater and the environmental conditions at the time of production), the conditions of drying the solution and the like, whereby ensuring a necessary quality level.

In addition, in order to achieve a higher density than that of CD, a digital video disk (hereinafter, referred to as DVD) for a laser beam having a wavelength of about 650 nm has been developed and commercially sold recently. Similarly to CD, this DVD is produced in the following manner: an optical recording layer, which has pits with a track pitch (TP) of 0.74 $\mu$m (about half of TP of CD (1.60 $\mu$m)) and with a shortest pit length of 0.40 $\mu$m, is provided on a resin substrate having a thickness of 0.6 mm by a stamper of a molding machine; a reflective film is provided on the optical recording layer; and another resin substrate having a thickness of 0.6 mm is laminated thereon by using an adhesive such as an ultraviolet curable resin in order to ensure strength suitable for the disk. As to such DVD, it is also desired to develop an optical recording medium (optical disk) which is able to write once and realizes the high density similarly to the write-once type CD-R, namely DVD-R.

For such a write-once type high density optical recording medium, pits corresponding to the information has to be stably formed and good quality signals have to be obtained from the pits at the time of reproduction by using a substrate having a narrower groove with a small track pitch less than a half of the track pitch of the CD-R. For this, when the track pitch and groove width of the substrate become smaller, the inclination profile of the groove depth along the radial direction becomes more larger in the substrate having the deep groove used in the coating type optical recording medium. Moreover, since the groove width becomes narrower, the inclination of the thickness profile of the light absorption layer becomes more larger. Due to the above, it is difficult to suitably ensure the aforementioned properties only by adjusting the substrate production conditions, the conditions of the application of the organic dye solution, the conditions of drying the solution and the like.

DISCLOSURE OF THE INVENTION

Therefore, the present invention aims at obtaining a stable tracking error signal and/or a stable radial contrast over an entire optical recording medium, and/or obtaining a high-quality reproduction signal with less output fluctuation, namely, a purpose of the present invention is to provide an optical recording medium having improved properties such as the above. Further, another purpose of the present invention is to provide a write-once type optical recording medium which is adaptable to the higher density.

The present invention provides an optical recording medium comprising a light absorption layer formed by means of vacuum deposition on a substrate having a spiral groove and a reflective layer formed on the light absorption layer, which medium is for recording information by irradiating the light absorption layer with a laser beam and reproducing the recorded information, characterized in that:

(1) a groove of the substrate defines a groove section and an inter-groove section, the groove section is defined by a groove bottom surface and side surfaces on both sides of the groove bottom surface, and has a cross section of a substantially trapezoid shape which is vertical to a longitudinal direction of the groove section (or a cross section along a radial direction of the substrate) such that the section spreads out towards the light absorption layer, and the inter-groove section is defined by an inter-groove top surface and side surfaces on both sides of the inter-groove top surface (which serve also as the side surfaces which define the groove section) and has a cross section of a substantially trapezoid shape vertical to a longitudinal direction of the inter-groove section (or a cross section along the radial direction of the substrate) such that the section gets narrow towards the light absorption layer;

(2) a ratio (W/TP) of a groove width (W) to a track pitch (TP) of the substrate falls within a range of 0.25 to 0.45;

(3) a groove depth (D) of the substrate is 20 to 80% of ($\lambda$/4n) (wherein A is a wavelength of a laser beam, and n is a refractive index of the substrate); and (4) angles a1 and a2 formed by the both side surfaces of the groove section and the surfaces vertical to the groove bottom surface on cross lines between the both side surfaces of the groove section and the groove bottom surface are respectively 45 to 800, and a difference between a1 and a2 (i.e. a1−a2) is not more than ±100.

Such an optical recording medium can be used as a CD-R or a DVD-R, for example.

It is noted that as for various dimensions (or sizes) used in the specification, the description will be given with reference to FIG. 1 which shows a schematic sectional view along a radial direction of the substrate (a cross section vertical to the circular surface of the substrate).

FIG. 1 is a cross sectional view along the radial direction of a portion of the substrate 10 of the optical recording medium according to the present invention, and in order to clarify meanings of the aforementioned various dimensions, FIG. 1 shows an enlarged view schematically. The substrate 10 has a spiral groove, and thereby has convex and concave sections on the surface of the substrate. The concave sections are the groove sections 12 and 12', and the convex sections are the inter-groove sections 14 and 14'. In the cross section as shown in FIG. 1, the concave sections and the convex sections are adjacent to each other alternately. A light absorption layer (not shown) and a reflective layer (not shown) are formed on the substrate of the embodiment shown in FIG. 1, and a laser beam is irradiated along a direction of the arrow A from the lower side of FIG. 1 upon recording/reproducing information.

As is clear from FIG. 1, the inter-groove section 14 is a portion of the substrate which is defined by an inter-groove top surface 16 and its both side surfaces 18 and 20'. Moreover, the groove section 12 is a space on a portion of the substrate which space is defined by a groove bottom surface 22 and its both side surfaces 18 and 20. As is understandable, the cross section of the inter-groove section 14 along the radial direction of the substrate is defined by the inter-groove top surface 16, the side surfaces 18 and 20', and a broken line 28 which connects a cross line between the groove bottom surface 22 and the side surface 18 to a cross line between the groove bottom surface 22' and the side surface 20' (in the embodiment shown in FIG. 1, the cross lines are shown by intersections 24 and 26'), and the cross section has a substantially trapezoidal shape such that it gets narrow towards the reflective layer. Moreover, the cross section of the groove section 12 along the radial direction of the substrate is defined by the groove bottom surface 22, the side surfaces 18 and 20, and a broken line 34 which connects a cross line between the inter-groove top surface 16 and the side surface 18 to a cross line between the inter-groove top surface 16' and the side surface 20 (in the embodiment shown in FIG. 1, the cross lines are shown by intersections 30 and 32), and the cross section has a substantially trapezoidal shape such that it spreads out towards the reflective layer.

In the specification, as shown in the drawing, the groove width (W) of the substrate is a length which is defined by a distance W between the points (36 and 38) on the side surfaces 18 and 20 which divide the depth of the groove section (D, corresponding to the height of the trapezoid). Moreover, the track pitch is a length which is defined by a distance TP between an edge of the inter-groove top surface 16 of the inter-groove section 14 (represented by a point 30') and an edge of the inter-groove top surface 16' of the inter-groove section 14' adjacent to the inter-groove section 14 (represented by a point 30).

The above-mentioned definitions of the dimensions are commonly used for defining a groove of a substrate for an optical recording medium.

In addition, in the specification, the angle a1 is an angle between a surface 40 vertical to the groove bottom surface 22 at an edge 24 of the groove section 12 and the side surface 18, and the angle a2 is an angle between a surface 42 vertical to the groove bottom surface 22 at an edge 26 of the groove section 12 and the side surface 20.

The present invention provides a substrate in the form of a disk shape in which a spiral groove is formed on one side of the substrate, wherein:

(a) a ratio of a groove width (W) to a track pitch (TP) of the substrate (W/TP) falls within a range of 0.25 to 0.45;

(b) a groove depth (D) is 20 to 80% of ($\lambda$/4n) (wherein $\lambda$ is a wavelength of a laser beam, and n is a refractive index of the substrate); and (c) angles (a1 and a2) formed by both side surfaces of a groove section and surfaces vertical to a groove bottom surface on cross lines between the both side surfaces of the groove section and the groove bottom surface are respectively 45 to 80°, and a difference between a1 and a2 (i.e. a1−a2) is not more than ±10°. Namely, the present invention provides a substrate and more specifically a substrate for a vacuum (vapor) deposition type optical recording medium so as to obtain an optical recording medium having more improved qualities in which a groove has the above described dimensions (or shape).

Furthermore, the present invention provides a metal mold and more specifically provides a stamper for forming the above substrate with using a resin. This metal mold can be used for molding and more specifically injection molding the resin for producing the substrate having the predetermined shapes as above described in (a) through (c). Such a metal mold can be produced by a usual stamper production method (namely, a method of producing a stamper to be used for forming the substrate of the conventional optical recording medium). More concretely, the metal mold can be produced by a fine fabrication process using laser processing combined with a photo-resist which process is used for producing a semiconductor element.

The later description about the optical recording medium according to the present invention is also applicable to the substrate and the metal mold according to the present invention as long as no specific problem arises.

Figure 1:
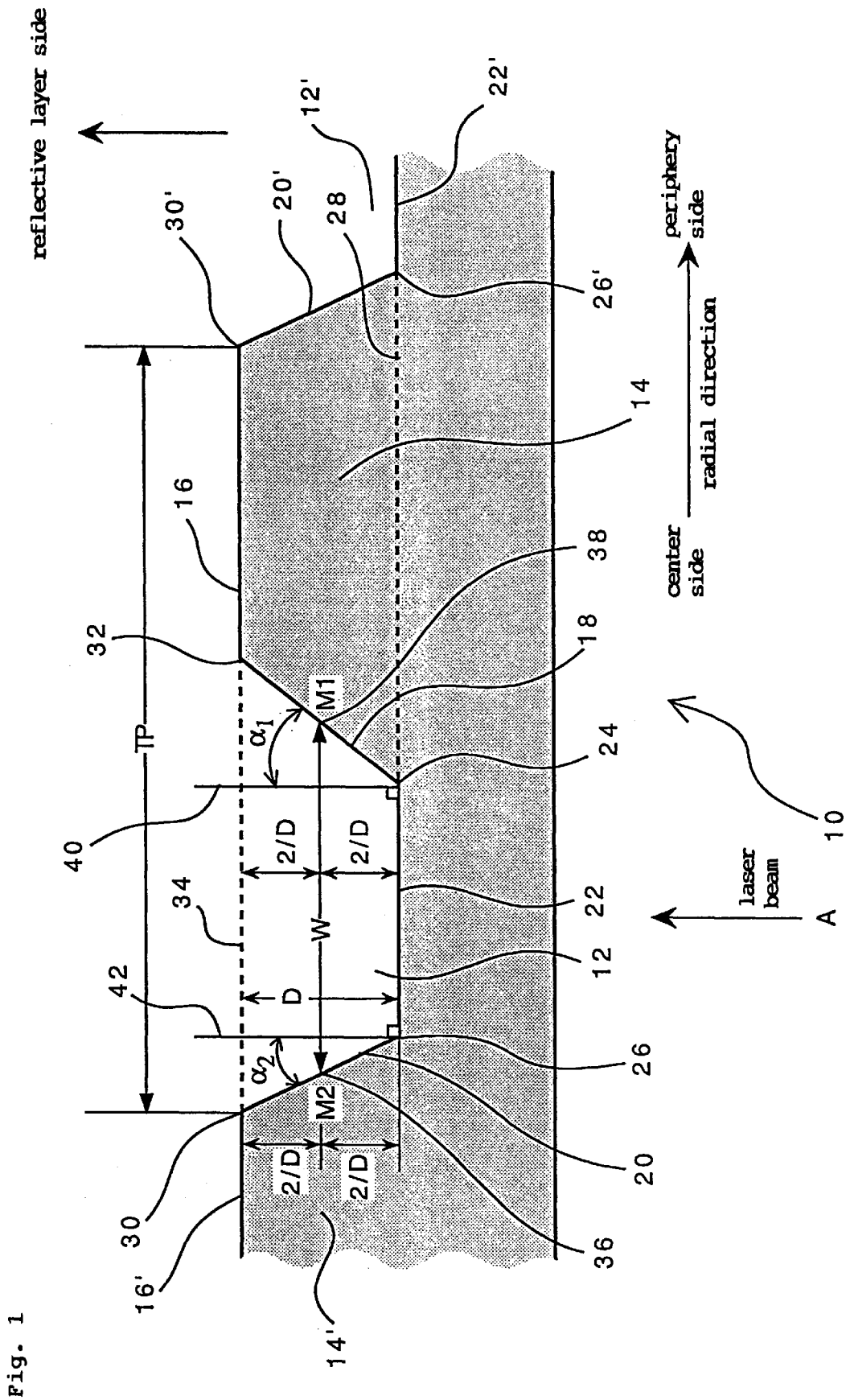
FIG. 1 is a cross sectional view taken vertically (namely, vertically to a main surface of a substrate) along a radial direction of a substrate schematically illustrating a partially enlarged substrate in order to explain various dimensions in the description.

In the drawings, reference numerals represent the following elements:

10 . . . substrate, 12 and 12' . . . groove section, 14 and 14' . . . inter-groove section, 16 and 16 ' . . . inter-groove top surface, 18, 20 and 20' . . . side surface, 22 . . . groove bottom surface, 24, 26 and 26' . . . cross line (intersecting edge) between groove bottom surface and side surface, 30, 30' and 32 . . . cross line (or intersecting edge) between inter-groove top surface and side surface (or edge), 36 and 38 . . . point or line which divides groove depth into two equal lengths, 40 and 42 . . . surface vertical to groove bottom surface at edge of groove bottom surface, 50 . . . substrate, 52 . . . light absorption layer, 54 . . . reflective layer, 56 . . . adhesive layer, 58 . . . substrate, 60 . . . groove

DETAILED DESCRIPTION OF THE INVENTION

In the present invention, the light absorption layer is formed by a vacuum (vapor) deposition method. According to this vacuum deposition method, an organic pigment material which is held in an evaporation container is heated under a high vacuum condition (for example, $1\times10^{-3}$ torr or less, preferably $1\times10^{-4}$ torr or less, for example $1\times10^{-5}$ torr) so as to be evaporated (or sublimated, hereinafter referred to as evaporated). Thereafter, the evaporated pigment material is attached on, that is deposited on a substrate having the groove. In this method, since the organic pigment, which has been evaporated in the evaporation container as an evaporation source, is deposited uniformly on the whole surface of the substrate including the groove sections and the inter-groove sections, the light absorption layer is easily formed on the whole surface of the substrate with a uniform thickness. This means that the surface shape of the light absorption layer on which the reflective layer is to be formed substantially corresponds to the uneven surface of the substrate or is close to the uneven surface. Namely, the surface shape (or geometry) of the light absorption layer easily is likely to become uneven substantially corresponding to the uneven surface of the substrate formed by the groove of the substrate (see a light absorption layer 52 and a groove 60 in FIG. 2).

Therefore, a difference in level between the surface of the light absorption layer formed in the groove sections of the substrate and the surface of the light absorption layer formed on the inter-groove sections (see "d" in FIG. 2) is determined by the groove depth (D) of the substrate. For this reason, in the case where the light absorption layer is formed by the vacuum deposition method, a tracking error signal can be adjusted by controlling the groove depth of the substrate. As a result, in order to obtain a tracking error signal whose level is similar or equal to that of the coating type optical recording medium, a substrate having a shallower groove than that of the substrate used for the coating type optical recording medium can be used in the vacuum deposition method. Thereby, the aforementioned problem of the inclination of the groove depth profile with respect to the radial direction of the substrate, which arises when the substrate is produced, is suppressed greatly in the case where the light absorption layer is formed by the vacuum deposition method. As described above, when the light absorption layer is formed by the vacuum deposition method, the thickness of the light absorption layer becomes uniform in the radial direction of the substrate, and even if the groove depth of the substrate is made shallower, the difference in level of the light absorption layers can be obtained. For this reason, changes in the properties over the whole surface of the substrate are small, namely, the stable properties can be obtained.

In the optical recording medium of the present invention which is obtained by forming the light absorption layer on the substrate according to the vacuum deposition method (hereinafter, referred to also as a deposition type optical recording medium), it is preferable that the ratio of the groove width (W) to TP of the substrate falls within a range of 0.25 to 0.45. When the ratio becomes smaller than 0.25, a ratio of the groove section to a spot diameter of a laser beam becomes smaller, and an amount of a light reflected from the inter-groove sections is controlling so that the tracking error signal becomes weak. Moreover, when the ratio becomes larger than 0.45, a difference in the reflected light amount between from the groove section and from the inter-groove sections becomes smaller, and thereby radial contrast becomes smaller. Therefore, when the ratio deviates from the above W/TP range, the properties of the optical recording medium are deteriorated.

In addition, in the optical recording medium of the present invention, it is preferable that the groove depth (D) falls within a range of 20% to 80% of ($\lambda$/4n). When the groove depth becomes smaller than the range, the tracking error signal becomes weak. When the groove depth becomes larger than 80%, reflectance becomes low. Therefore, the properties of the optical recording medium are deteriorated.

In the formation of the light absorption layer according to the vacuum deposition method, if foreign matters exist on the substrate, or if a portion of the uneven surface of the substrate is abruptly inclined in a surface along the radial direction (namely, a circular main surface composing the substrate) molecules of the evaporated organic pigment material collide against the foreign matters or the portion which is abruptly inclined. As a result, the molecules cannot deposit the rear side of the foreign matters or such a portion (for example, a corner of the groove section of the substrate (in the vicinity of a cross line between the side surface and the groove bottom surface)) (herein, this is called as a shadow or a blind effect). Namely, the foreign matters or the portion which is abruptly inclined interferes deposition (or accumulation) of the evaporated pigment molecules, and the evaporated pigment molecules hardly deposit the rear side of the foreign matters or such a portion. As a result, the thickness of the light absorption layer on the rear side is apt to become thin partially. On the contrary, the organic pigment which has been evaporated or sublimated from an evaporation source is likely to be deposited comparatively uniformly on a portion where the foreign matters do not exist or a portion which is gently inclined.

In addition, as for the groove of the substrate, the groove width, the groove depth and the uneven state of the substrate surface including the inclination of the side surface of the groove are not always constant due to difference of the groove shape of the stamper lot at the time of production of the stamper, fluctuation in the conditions of the substrate molding and the like.

As a result from the above, irregularity in the thickness can occur on the light absorption layer which has been deposited on the surface of the substrate, in the vicinity of the corners of the groove along the groove of the substrate. With respect to the irregularity of the thickness of the light absorption layer, the following has been found: when a1 and a2 are smaller than 45°, the influence of the aforementioned blind effect becomes great; and accordingly, the irregularity of the thickness of the light absorption layer becomes larger around the edges (or corners) of the groove sections and the fluctuation of the reproduction signal become large, and thus they substantially exert a bad influence on the quality of the optical recording medium.

In addition, when a1 and a2 are larger than 80°, a ratio of the inter-groove sections of the substrate to the spot diameter of the laser beam becomes smaller, and an amount of the reflected light from the groove sections is controlling. As a result, it has been found that the tracking error signal becomes weak, and the irregularity of the thickness substantially exerts a bad influence on the quality of the optical recording medium.

Therefore, it is preferable that the angles a1 and a2 between the side surfaces of the groove section and the surfaces vertical to the groove bottom surface on the cross lines between the side surfaces of the groove section and the groove bottom surface of the substrate which is used for the deposition type optical recording medium (in FIG. 1, the angle between a vertical line at an intersection for example a point 24, i.e., a line 40 and a side surface 18) respectively fall within a range of 45 to 80°.

The case where degree of the inclination of the both side surfaces of the groove section of the substrate is different will be considered. In the coating type optical recording medium, the light absorption layer is formed with most of the organic pigment being into the groove section. Due to this reason, change in properties and decomposition of the pigment due to irradiation of a laser, and deformation of the substrate due to the heat generated upon the decomposition occur on the groove sections, and a recording (information) pit string (or sequence) is formed in the groove sections.

On the contrary, in the deposition type optical recording medium, since the thickness of the light absorption layer is substantially uniform in the groove sections and on the groove sections, when inclination extents of the both side surfaces of the groove sections of the substrate are changed, the spot of the laser beam always leans towards one side surface in the groove sections. Therefore, the laser beam is liable to track mostly said one side surface of the groove sections.

In addition, the state of the groove fluctuates variously as mentioned above, and particularly the pit string after recording is formed which string includes largely one side surface of the groove and staggers right and left due to the influence of the fluctuation including particularly the state of the side surface of the groove and the like. When a ratio of the side surfaces of the groove which the pit string includes is changed in such a manner as described above, the deformation state of the substrate due to the decomposition heat of the organic pigment is changed. As a result, the recording pit length is liable to change. Moreover, since the recording pits are formed with staggering right and left, an amount of the reflected light from the recording pit is liable to change at the time of reproduction. Therefore, the difference in the inclination of the side surfaces influences the quality of the optical recording medium.

With respect to the above, when a difference between a1 and a2 is larger than ±10°, this influence appears remarkably, and fluctuation of a reproduced output signal becomes larger. As a result, there arises a problem about the quality of the optical recording medium. On the contrary, it has been found that when the difference is not more than ±10°, there does not substantially arise the problem about the quality of the optical recording medium. Therefore, it is preferable that the difference between the angles a1 and a2 formed by the groove side surfaces and the surfaces vertical to the groove bottom surface (or vertical lines) on the crossing sections (or intersections) between the side surfaces of the groove section and the groove bottom surface of the substrate used for the deposition type optical recording medium is not more than ±10°.

The present invention is most characteristic in the groove shape of the substrate which constitutes the optical recording medium, and as for the other elements which constitute the optical recording medium, the publicly known techniques related to the deposition type optical recording medium can be applied. These techniques are disclosed, for example, in Japanese Patent Application Laid-Open Nos. 54-164627 (1979), 62-216795 (1987), 4-178934 (1992), 9-7237 (1997), 9-11619 (1997), 9-81958 (1997), and 10-11798 (1998). The disclosures of these publications constitute a portion of the present description by the references to the publications as long as they do not adversely affect of the present invention. The following will describe the other elements constituting the optical recording medium of the present invention which are preferably combined with the aforementioned groove shape of the substrate in order to practice the present invention.

In the optical recording medium of the present invention, it is preferable that the light absorption layer is composed of the organic pigment, an evaporation (or sublimation) starting temperature of the organic pigment falls within a range of 100 to 350° C., and a difference between the evaporation (or sublimation) starting temperature and a decomposition temperature of the organic pigment falls within a range of 50 to 400° C.

It is noted that the evaporation (or sublimation) starting temperature refers to a temperature of an evaporation source of the organic pigment when the organic pigment is heated under a vacuum of not more than $1 \times 10^{-5}$ Torr and a quartz (or crystal)-oscillation-type film thickness indicator shows a value of 0.1 nm/sec. More concretely, the evaporation (or sublimation) starting temperature of the pigment material refers to a temperature of an evaporation container (a temperature of the portion of the evaporation container which portion is in contact with the pigment material charged in the evaporation vessel, i.e., a temperature at which the pigment material is heated) at which temperature a recording film formation speed just exceeds 1 (Å/sec) when the evaporation container is gradually heated while measuring the film formation speed by means of an evaporation rate monitor of the quartz-oscillator type (an apparatus for measuring a thickness of the film formed on the substrate, manufactured by Nippon Shinkuu Gijutsu Co., Ltd., trade name: CRTM-5000), the temperature being measured by a thermocouple embedded in the evaporation vessel upon forming the recording film by the deposition of the pigment material on the substrate (which is made of a polycarbonate and which is at a temperature of 50° C. or less) for the optical recording medium, the substrate being located 30 cm above the evaporation container (for example, a boat form container made of molybdenum) when the pigment material is charged into the evaporation container and evaporated by heating the evaporation container in a chamber maintained at a vacuum degree of $1 \times 10^{-4}$ Torr or less. Moreover, the decomposition starting temperature of the pigment material refers to a heat generating temperature of the differential thermal analysis of the pigment material.

As a material which is suitable for the light absorption layer of the optical recording medium on which information is recorded by means of irradiation with a laser, an inorganic or organic (based) pigment can be used. Since the property changing temperature and the decomposition temperature of the inorganic pigment are high, and a laser power to be used for recording is limited when used as the CD-R or the like, a sufficient pit cannot be formed. On the contrary, as for the organic pigment, the recording power is suitable, and thus it is preferable that the organic pigment is used for the light absorption layer of the optical recording medium.

When the evaporation (or sublimation) starting temperature of the organic pigment is lower than 100° C., reliability cannot be ensured due to the influence of the environment during the transportation and the storage of the optical recording medium (a temperature of about 50° C.). Moreover, when the evaporation starting temperature is higher than 350° C., the decomposition temperature becomes relatively high. For this reason, the laser power becomes stronger at the time of recording and the like, namely, the properties for the optical recording medium are deteriorated. Therefore, it is preferable that the evaporation (or sublimation) starting temperature of the organic pigment to be used for the deposition type optical recording medium falls within a range of 100 to 350° C.

When the difference between the evaporation (or sublimation) starting temperature and the decomposition temperature of the organic pigment is smaller than 50° C., it is impossible to form the light absorption layer having a uniform quality because of the following. When the light absorption layer is formed on the substrate by the deposition method with an increased evaporation rate by setting the temperature of the evaporation source to be 20 to 30° C. higher than the evaporation starting temperature, or when the temperature of the evaporation source is scattered, the organic pigment starts to decompose in the evaporation vessel, or bumping of the organic pigment occurs due to the decomposition.

Further, when the difference between the evaporation (or sublimation) starting temperature and the decomposition temperature is larger than 400° C., the decomposition temperature of the organic pigment becomes relatively high, and thus the laser power for recording becomes stronger and the like. As a result, the properties of the optical recording medium are deteriorated. Therefore, it is preferable that the difference between the evaporation or sublimation starting temperature and the decomposition temperature of the organic pigment to be used for the deposition type optical recording medium falls within a range of 50 to 400° C.

In the optical recording medium of the present invention, the reflective layer may be formed by a material which is generally used for the optical recording medium. For example, aluminum, silver or an alloy mainly containing them may be used. As the reflective film, a material whose light reflectance is high is suitable. In the CD-R, gold is used as the reflective layer, but when a wavelength becomes shorter than 650 nm, the reflectance of the gold is lowered abruptly. On the contrary, as for aluminum, silver or alloy mainly containing them, the reflectance thereof is high and the change in the reflectance above a wavelength of 400 nm is small. Therefore, the optical recording medium, in which the reflective layer is formed by using aluminum, silver or the alloy mainly containing them, can be adapted to the higher density as in DVD-R.

In the optical recording medium of the present invention, a protective layer may be formed over the recording layer, or another substrate may be provided over the recording layer via an adhesive. Further, a printing layer including predetermined necessary matters may be formed on the protective layer or on another substrate.

The optical recording medium according to embodiment of the present invention will be further described with reference to FIG. 2.

Figure 2:
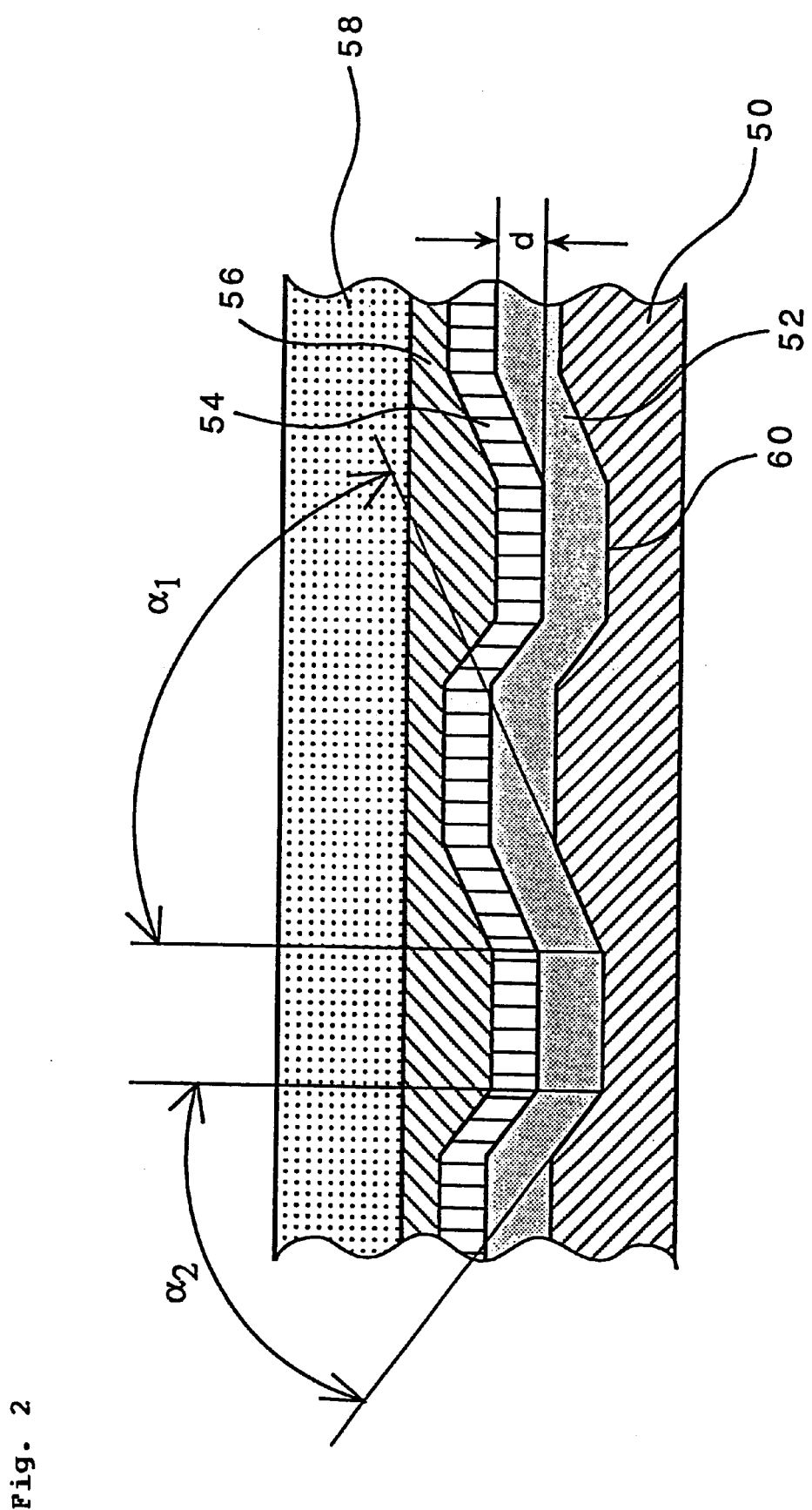
FIG. 2 is a cross sectional view taken vertically (namely, vertically to a main surface of an optical recording medium) along a radial direction of an optical recording medium schematically illustrating a partially enlarged optical recording medium of an embodiment according to the present invention.

FIG. 2 is an enlarged cross sectional view schematically showing a portion of the optical recording medium of the present invention (the cross sectional view along a surface including the diameter of the substrate). A spiral groove 60 is provided in one surface of a substrate 50 made of a transparent resin such as a polycarbonate. A light absorption layer 52, which is formed by means of the vacuum deposition of the organic pigment, and a reflective layer 54, which is made of silver or the like are provided in this order on the surface of the substrate 50 on which surface the groove is provided. A substrate 58 made of a polycarbonate is adhered onto the reflective layer 54 via an adhesive layer 56, which is made of an ultraviolet curable resin or the like.

As the substrates 50 and 58, an acrylic resin, an epoxy resin, a polyolefin and the like can be used as long as they have the similar properties to those of the polycarbonate. Further, as for the substrate 58, another material can be used as long as it does not deteriorate mechanical properties as the optical recording medium.

As for the groove 60 provided in the substrate 50, it is preferable that a groove width (W)/ a track pitch (TP) falls within a range of 0.25 to 0.45, and more preferably within a range of 0.30 to 0.40. It is preferable that the groove depth (D) falls within a range of 20 to 80% of ($\lambda$/4n) wherein $\lambda$ is a wavelength of a laser and n is a refractive index of the substrate, and more preferably within a range of 30 to 60%. It is preferable that angles a1 and a2 formed by the groove side surfaces and the vertical lines from the intersections between the both side surfaces of the groove and the groove bottom surface fall within a range of 45 to 80°, more preferably within a range of 55 to 75°, and preferably in particular within a range of 65 to 75°. Moreover, it is preferable that the difference between a1 and a2 is not more than ±10°, more preferably not more than ±5°, and preferably in particular not more than ±3°.

As the light absorption layer 52, any organic pigment as long as it is able to be deposited. Examples of such an organic pigment are a porphine based pigment such as a phthalocyanine based pigment, a naphthalocyanine based pirgment and a porphyrin based pigment, a merocyanine based pigment, a quinone based pigment, an azo based pigment, a cation based pigment, an indophenol based pigment, a metal complex pigment and the like. In particular, the porphines, the merocyanine based and the azo based pigments are preferable.

It is preferable that the evaporation (or sublimation) starting temperature of the organic pigment falls within a range of 100 to 350° C., and more preferably within a range of 150 to 300° C. Moreover, it is preferable that the difference between the evaporation (or sublimation) starting temperature and the decomposition temperature of the organic pigment falls within a range of 50 to 400° C., and more preferably within a range of 100 to 350° C.

It is preferable that a thickness of the light absorption layer 52 falls within a range of 20 to 400 nm and more preferably within a range of 40 nm to 300 nm when the reflectance and a degree of modulation are taken into consideration. It is noted that the aforementioned organic pigments may be used alone, or they may be mixed with each other or laminated with each other so as to form the light absorption layer, or they may be mixed or laminated with other organic pigments so as to form the light absorption layer 52. Moreover, it is noted that other material may be mixed or laminated as long as it does not deteriorate the properties of the optical recording medium or greatly reduce the effects of the present invention.

Gold can be used as the reflective layer 54 in the CD-R because its reflectance is high and it has excellent durability against environment such as humidity and the like. However, when pin holes or coating non-uniformity of the end portion to be an exposed surface of the optical recording medium such as a protective layer (in the case of the CD-R) or an adhesive layer (in the case of a write-once high density optical recording medium such as DVD) is suppressed so that the durability against the humidity and the like is improved, a material which is other than gold and has high reflectance can be also used. For example, materials such as aluminum, silver, copper, platinum, chromium, nickel, titanium and an alloy mainly containing them, which do not deteriorate the properties of the optical recording medium, can be deposited by means of the sputtering, the vacuum deposition or the like so as to be used as the reflective layer. Particularly, aluminum, silver and the alloy mainly containing them are suitable for the optical recording medium which is adapted to the higher density.

Furthermore, an oxide and a nitride of the above mentioned metals may be used as long as they do not deteriorate the properties of the optical recording medium, and an oxide and a nitride of a material other than aluminum and silver may be contained in the reflective layer containing aluminum or silver. Moreover, the reflective layers may be laminated like a laminate of a dielectric as long as such lamination does not deteriorate the properties of the optical recording medium. It is preferable that a thickness of the reflective layer 3 falls within a range of 30 to 200 nm and more preferably within a range of 50 to 100 nm when its reflectance and cost are taken into consideration.

The adhesive layer 56 is formed by an adhesive made of a macromolecular material such as an ultraviolet curable resin.

Industrial Applicability of the Invention

According to the optical recording medium of the present invention for recording/reproducing information by irradiating the light absorption layer with a laser, in which the light absorption layer deposited on the substrate having the spiral groove and the reflective layer thereon are formed, since the groove has the specific shape, the more stable properties are obtained over the whole surface of the disk, thereby providing the write-once optical recording medium which is adapted to the higher density.

EXAMPLES

The following will describe some examples of the present invention as well as some comparative examples.

Example 1

A substrate was used which had a diameter of 120 mm and a thickness of 0.6 mm, which is provided with a spiral groove (a groove width W, a groove depth D and a track pitch TP are respectively 0.27 $\mu$m, 5.1 nm and 0.74 $\mu$m, and a1 and a2 are 67° respectively) on its one surface and was made of a polycarbonate. W/TP was 0.36, a wavelength A of a laser was 639 nm and a refractive index n of the substrate is 1.55, and thus the groove depth D was 49% of ($\lambda$/4n).

5,10,15,20-tetraphenylporphyrin vanadium as an organic pigment was deposited on the substrate so that a light absorption layer having a thickness of 160 nm was formed. An evaporation starting temperature of this pigment was 190° C., and a difference between the evaporation starting temperature and a decomposition temperature was 260° C. Silver was sputtered so that a reflective layer having a thickness of 100 nm was formed on the light absorption layer, a substrate having a thickness of 0.6 mm and made of a polycarbonate was laminated on the reflective layer by means of an ultraviolet curable acrylate resin so that the optical recording medium of the present invention (DVD-R) was produced.

Example 2

The optical recording medium of the present invention was produced in the same manner as in Example 1 except that 5,10,15,20-tetraphenylporphyrin zinc was used as the organic pigment and the light absorption layer having a thickness of 151 nm was formed on the substrate by means of the vacuum deposition. The evaporation starting temperature of this pigment was 190° C., and the difference thereof from the decomposition temperature was 240° C.

Example 3

A substrate, in which a groove width, a groove depth and TP were respectively 0.29 $\mu$m, 60 nm and 0.74 $\mu$m, and a1 and a2 were respectively 70° and 71°, and thus a1−a2 was −1°, was used. 5,10,15,20-tetrakis (4-methoxyphenyl) porphyrin cobalt as the organic pigment was deposited on the substrate so that a light absorption layer having a thickness of 153 nm was formed. The evaporation starting temperature of this pigment was 200° C., and the difference thereof from the decomposition temperature was 240° C. The optical recording medium of the present invention was produced in the same manner as in Example 1 as to the other conditions. A groove width/TP was 0.39, and a groove depth was 58% of ($\lambda$/4n).

Example 4

A substrate, in which a groove width, a groove depth and TP were respectively 0.25 $\mu$m, 38 nm and 0.74 $\mu$m, and a1 and a2 were respectively 660 and 680, and a1−a2 was −2°, was used. Aluminum was sputtered so that a reflective layer having a thickness of 100 nm was formed, and a disk was produced in the same manner as in Example 3 as to the other conditions. The groove width/TP was 0.34, and the groove depth was 37% of (λ/4n).

Example 5

A substrate having a diameter of 120 mm and a thickness of 1.2 mm, which was provided with a spiral groove (a groove width, a groove depth and TP were respectively 0.51 μm, 43 nm and 1.69 μm, and a1 and a2 were both 670) on its one surface and made of a polycarbonate, was used. A mixed pigment of 5, 10, 15, 20-tetrakis (4-methoxyphenyl) porphyrin cobalt and tin dichloro phthalocyanine in the ratio of 1:1 was deposited as an organic pigment on the substrate so that a light absorption layer having a thickness of 135 nm was formed thereon. The evaporation starting temperature of the tin dichloro phthalocyanine was 250° C., and the difference thereof from the decomposition temperature was 320° C. Silver was sputtered so that a reflective layer having a thickness of 100 nm was formed on the optical recording layer, and an ultraviolet curable acrylate resin was applied by a spin coater and cured so that an optical disk (CD-R) was produced. The groove width/TP was 0.32, and a wavelength A of a laser was 788 nm, a refractive index n of the substrate was 1.55, and thus the groove depth was 34% of (λ/4n).

Example 6

A substrate made of polycarbonate, in which a groove width, a groove depth and TP were respectively 0.64 μm, 50 nm and 1.60 μm, and a1 and a2 are respectively 680 and 660, and a1−a2 is 2°, was used so that a disk was produced in the same manner as in Example 5. The groove width/TP was 0.40, and the groove depth was 39% of (λ/4n).

Moreover, disks of Comparative Examples 1 through 4 were produced in order to compare them with those of Examples 1 through 6.

Comparative Example 1

A substrate, in which a groove width, a groove depth and TP were respectively 0.25 μm, 51 nm and 0.74 μm, and a1 and a2 were respectively 270 and 250, and a1−a2 was 20, was used so that a disk was produced in the same manner as in Example 1. The groove width/TP was 0.34, and the groove depth was 49% of (λ/4n).

Comparative Example 2

A substrate, in which a groove width, a groove depth and TP were respectively 0.36 μm, 59 nm and 0.74 μm, and a1 and a2 were 230, was used so that a disk was produced in the same manner as in Example 3. The groove width/TP was 0.49, and the groove depth was 57% of (λ/4n).

Comparative Example 3

A substrate, in which a groove width, a groove depth and TP were respectively 0.29 μm, 17 nm and 0.74 μm, and a1 and a2 were respectively 680 and 670, and a1−a2 is 1°, was used so that a disk was produced in the same manner as in Example 3. The groove width/TP was 0.39, and the groove depth was 16% of (λ/4n).

Comparative Example 4

A substrate, in which a groove width, a groove depth and TP were respectively 0.64 μm, 49 nm and 1.60 μm, and a1 and a2 were respectively 690 and 820, and a1−a2 is −13°, was used so that a disk was produced in the same manner as in Example 6. The groove width/TP was 0.40, and the groove depth was 39% of (λ/4n).

The optical recording media (disks) produced in the above Examples and Comparative Examples were evaluated. When the disk of which TP was 0.74 μm, was evaluated, an optical disk evaluation apparatus manufactured by Pulstec Industrial Co., Ltd (DDU-1000) in which a wavelength of a laser beam was 639 nm, was used, and when the disk of which TP was 1.60 μm was evaluated, a CD-R tester manufactured by Pulstec Industrial Co., Ltd. in which a wavelength of a laser beam was 788 nm, was used, so that tracking error signals (TE) and radial contrast signals (RC) in an inner and an outer peripheries of the disks were measured. Moreover, changes in output signals when information was recorded and reproduced in the disks were observed by using these apparatuses, and the evaluation was made in such a manner that a disk which exhibited small output changes was represented by (○), and a disk which exhibited great output changes, namely, which was hardly used as the optical recording medium was represented by (Δ).

It is noted that the radial contrast was obtained according to (an amount of a reflected light from the inter-groove sections−an amount of a reflected light from the groove section)×2/(the amount of the reflected light from the inter-groove sections+the amount of the reflected light from the groove section). The measured results are shown in the following Table 1:

TABLE 1

| | | TE (mV) | | RC % | | |
|---|---|---|---|---|---|---|
| | λ (nm) | Inner Periph-ery | Outer Periph-ery | Inner Periph-ery | Outer Periph-ery | Output Change |
| Example 1 | 639 | 171 | 167 | 5 | 5 | ○ |
| Example 2 | | 160 | 162 | 5 | 5 | ○ |
| Example 3 | | 181 | 179 | 5 | 5 | ○ |
| Example 4 | | 165 | 165 | 5 | 5 | ○ |
| Example 5 | 788 | 476 | 470 | 12 | 11 | ○ |
| Example 6 | | 548 | 545 | 14 | 14 | ○ |
| Comp. Example 1 | 639 | 168 | 166 | 5 | 5 | Δ |
| Comp. Example 2 | | 185 | 184 | 0.5 | 0.5 | ○ |
| Comp. Example 3 | | 63 | 60 | 2 | 2 | ○ |
| Comp. Example 4 | 788 | 545 | 540 | 10 | 10 | Δ |

As is clear from Table 1, it is understood that the property change is stably small in the inner and the outer peripheries of the optical recording media of the present invention, and therefore, that the present invention provides the write-once optical recording medium which exhibits stable properties and is adapted to the higher density.

What is claimed is:

1. An optical recording medium for recording information by irradiating the optical recording medium with a laser beam having a wavelength, comprising:

a substrate having first and second opposite facing surfaces, and a spiral groove extending from said first surface towards said second surface, wherein said spiral groove is defined by (i) a bottom surface located between said first and second surfaces, (ii) a first side wall extending from said bottom surface to said first surface, and (iii) a second side wall extending from said bottom surface to said first surface, a light absorption layer formed by vacuum deposition on said first surface, said bottom surface, said first side wall and said second side wall, wherein said light absorption layer contains an organic pigment having an evaporation starting temperature and a decomposition temperature, with said evaporation starting temperature being within a range of 100° C. to 350° C. and a difference between said evaporation starting temperature and said decomposition temperature being within a range of 50° C. to 400° C.; and a reflective layer formed on said light absorption layer; wherein, (a) a radially extending distance from an intersection of said first side wall and said first surface of a first turn of said spiral groove to an intersection of said first side wall and said first surface of a second turn of said spiral groove corresponds to a track pitch;

(b) said spiral groove has a radially extending width measured from said first side wall to said second side wall, such that a ratio of said radially extending width to said track pitch is within a range of 0.25 to 0.45;

(c) said spiral groove has a depth extending orthogonally to said radially extending width and measured from said bottom surface to a plane containing said first surface, and said substrate has a refractive index, such that said depth is 20% to 80% of ¼×(the wavelength divided by said refractive index); and (d) said first side wall forms a first angle with a plane extending orthogonally to said bottom surface within a range of 45° to 80°, and said second side wall forms a second angle with a plane extending orthogonally to said bottom surface within a range of 45° to 80°, such that said spiral groove has a trapezoidal cross-section that increases in area from said bottom surface towards said first surface, and respective portions of said substrate between adjacent turns of said spiral groove have a trapezoidal cross-section that increases in area from said first surface towards said second surface, wherein a difference between said first angle and said second angle is not more than 10°.

2. The optical recording medium according to claim 1, wherein said radially extending width is a line segment that bisects said depth.

3. The optical recording medium according to claim 1, wherein said reflective layer contains a material selected from the group consisting of aluminum, silver, an aluminum alloy and a silver alloy.

4. The optical recording medium according to claim 3, wherein said optical recording medium is one of a CD-R and a DVD-R.

5. The optical recording medium according to claim 1, wherein said substrate is of a material selected from the group consisting of polycarbonate, acrylic resin, epoxy resin and polyolefin.

6. The optical recording medium according to claim 1, wherein said organic pigment is selected from the group consisting of a porphine based pigment, a merocyanine based pigment and an azo based pigment.

7. The optical recording medium according to claim 1, wherein said optical recording medium is one of a CD-R and a DVD-R.

8. An optical recording medium for recording information by irradiating the optical recording medium with a laser beam having a wavelength, comprising:

a substrate having first and second opposite facing surfaces, and a spiral groove extending from said first surface towards said second surface, wherein said spiral groove is defined by (i) a bottom surface located between said first and second surfaces;

(ii) a first side wall extending from said bottom surface to said first surface; and (iii) a second side wall extending from said bottom surface to said first surface;

a light absorption layer formed by vacuum deposition on said first surface, said bottom surface, said first side wall and said second side wall; and a reflective layer formed on said light absorption layer; wherein, (a) a radially extending distance from an intersection of said first side wall and said first surface of a first turn of said spiral groove to an intersection of said first side wall and said first surface of a second turn of said spiral groove corresponds to a track pitch;

(b) said spiral groove has a radially extending width measured from said first side wall to said second side wall, such that a ratio of said radially extending width to said track pitch is within a range of 0.25 to 0.45;

(c) said spiral groove has a depth extending orthogonally to said radially extending width and measured from said bottom surface to a plane containing said first surface, and said substrate has a refractive index, such that said depth is 20% to 80% of ¼×(the wavelength divided by said refractive index); and (d) said first side wall forms a first angle with a plane extending orthogonally to said bottom surface within a range of 45° to 80°, and said second side wall forms a second angle with a plane extending orthogonally to said bottom surface within a range of 45° to 80°, such that said spiral groove has a trapezoidal cross-section that increases in area from said bottom surface towards said first surface, and respective portions of said substrate between adjacent turns of said spiral groove have a trapezoidal cross-section that increases in area from said first surface towards said second surface, wherein a difference between said first angle and said second angle is not more than 10°.

9. The optical recording medium according to claim 8, wherein said radially extending width is a line segment that bisects said depth.

10. The optical recording medium according to claim 8, wherein said light absorption layer contains an organic pigment.

11. The optical recording medium according to claim 10, wherein said reflective layer contains a material selected from the group consisting of aluminum, silver, an aluminum alloy and a silver alloy.

12. The optical recording medium according to claim 11, wherein said optical recording medium is one of a CD-R and a DVD-R.

13. The optical recording medium according to claim 10, wherein said organic pigment is selected from the group consisting of a porphine based pigment, a merocyanine based pigment and an azo based pigment.

14. The optical recording medium according to claim 10, wherein said optical recording medium is one of a CD-R and a DVD-R.

15. The optical recording medium according to claim 8, wherein said substrate is of a material selected from the group consisting of polycarbonate, acrylic resin, epoxy resin and polyolefin.

16. The optical recording medium according to claim 8, wherein said reflective layer contains a material selected from the group consisting of aluminum, silver, an aluminum alloy and a silver alloy.

17. The optical recording medium according to claim 16, wherein said optical recording medium is one of a CD-R and a DVD-R.

18. The optical recording medium according to claim 8, wherein said optical recording medium is one of a CD-R and a DVD-R.

19. A substrate for irradiation with a laser beam having a wavelength, comprising:

first and second opposite facing surfaces; and a spiral groove extending from said first surface towards said second surface, wherein said spiral groove is defined by (i) a bottom surface located between said first and second surfaces;

(ii) a first side wall extending from said bottom surface to said first surface; and (iii) a second side wall extending from said bottom surface to said first surface; wherein, (a) a radially extending distance from an intersection of said first side wall and said first surface of a first turn of said spiral groove to an intersection of said first side wall and said first surface of a second turn of said spiral groove corresponds to a track pitch;

(b) said spiral groove has a radially extending width measured from said first side wall to said second side wall, such that a ratio of said radially extending width to said track pitch is within a range of 0.25 tO 0.45;

(c) said spiral groove has a depth extending orthogonally to said radially extending width and measured from said bottom surface to a plane containing said first surface, and said substrate has a refractive index, such that said depth is 20% to 80% of ¼×(the wavelength divided by said refractive index); and (d) said first side wall forms a first angle with a plane extending orthogonally to said bottom surface within a range of 45° to 80°, and said second side wall forms a second angle with a plane extending orthogonally to said bottom surface within a range of 45 to 80, wherein a difference between said angles is not more than 10°.

20. The substrate according to claim 19, wherein said radially extending width is a line segment that bisects said depth.

21. The substrate according to claim 19, wherein said substrate is of a material selected from the group consisting of polycarbonate, acrylic resin, epoxy resin and polyolefin.

22. A stamper for forming the substrate of claim 19 from a resin.

* * * * *